United States Patent
Kelekar (10) Patent No.: US 11,391,976 B2
(45) Date of Patent: Jul. 19, 2022

(54) VAPOR BARRIER FOR E-PAPER

(71) Applicant: HEWLETT-PACKARD DEVELOPMENT COMPANY, L.P., Houston, TX (US)

(72) Inventor: Rajesh Kelekar, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1016 days.

(21) Appl. No.: 16/076,551

(22) PCT Filed: Jun. 13, 2017

(86) PCT No.: PCT/US2017/037183
§ 371 (c)(1),
(2) Date: Aug. 8, 2018

(87) PCT Pub. No.: WO2018/231201
PCT Pub. Date: Dec. 20, 2018

(65) Prior Publication Data
US 2021/0181567 A1    Jun. 17, 2021

(51) Int. Cl.
*G02F 1/1333* (2006.01)
*G02F 1/1675* (2019.01)

(52) U.S. Cl.
CPC ...... *G02F 1/133311* (2021.01); *G02F 1/1675* (2019.01); *G02F 2201/50* (2013.01)

(58) Field of Classification Search
CPC .......... G02F 1/133311; G02F 1/1675; G02F 2201/50; G02F 1/16756; G02F 2201/501; G02F 2202/28; G02F 1/167
USPC .................. 359/237, 238, 290, 296
See application file for complete search history.

(56) References Cited

U.S. PATENT DOCUMENTS

| | | |
|---|---|---|
| 7,898,726 B2 | 3/2011 | Ito et al. |
| 8,634,127 B2 | 1/2014 | Shih et al. |
| 9,087,488 B1 | 7/2015 | Zehner |
| 9,182,646 B2 | 11/2015 | Paolini et al. |
| 9,242,424 B2 | 1/2016 | Nakamura et al. |
| 9,541,807 B2 | 1/2017 | Park et al. |
| 9,595,544 B2 | 3/2017 | Chikama et al. |
| 2002/0071077 A1 | 6/2002 | Namba |
| 2007/0146309 A1 | 6/2007 | Uchida |
| 2008/0062506 A1 | 3/2008 | Sah |
| 2008/0138633 A1 | 6/2008 | Park |

(Continued)

FOREIGN PATENT DOCUMENTS

| | | |
|---|---|---|
| GB | 2477051 A | 7/2011 |
| GB | 2519777 A | 5/2015 |

(Continued)

OTHER PUBLICATIONS

Morreale, "Products on Display at Display Week 2007—Edge-Encapulation Resins", Retrieved from Internet: http://informationdisplay.org/IDArchive/2007/MayJune/ProductsonDisplayatDisplayWeek2007, May 22-24, 2007, 25 pages.

*Primary Examiner* — Tuyen Tra
(74) *Attorney, Agent, or Firm* — Dicke Billig & Czaja PLLC (57) ABSTRACT

An e-paper assembly includes a charge-responsive, re-writable media layer and an airborne-charge receiving layer disposed on the first side of the media layer. A moisture vapor barrier is interposed between the airborne-charge receiving layer and a first side of the charge-responsive media layer, with the moisture vapor barrier including an inorganic material.

13 Claims, 5 Drawing Sheets

(56) References Cited

U.S. PATENT DOCUMENTS

| | | |
|---|---|---|
| 2009/0185260 A1 | 7/2009 | Uchida |
| 2010/0302620 A1 | 12/2010 | Makubo et al. |
| 2017/0052420 A1 | 2/2017 | Chun |
| 2017/0052421 A1 | 2/2017 | Chun |
| 2017/0088758 A1 | 3/2017 | Bzowej et al. |
| 2017/0098668 A1 | 4/2017 | Huitema |

FOREIGN PATENT DOCUMENTS

| | | |
|---|---|---|
| JP | 63056629 | 3/1988 |
| JP | 2005326662 | 11/2005 |
| JP | 2006258981 A | 9/2006 |
| KR | 100710996 B1 | 4/2007 |
| WO | 2015163907 A1 | 10/2015 |

VAPOR BARRIER FOR E-PAPER

BACKGROUND

Electronic paper ("e-paper") is a display technology designed to recreate the appearance of ink on ordinary paper. Some examples of e-paper reflect light like ordinary paper and may be capable of displaying text and images. Some e-paper may be implemented as a flexible, thin sheet, like paper. One familiar e-paper implementation includes e-readers.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to providing a moisture vapor barrier for a passive e-paper assembly such that displayed images will be retained despite presence of the e-paper assembly in variable humidity conditions. In particular, it is desirable to retain satisfactory image quality regardless of where the location and/or type of environment in which the e-paper assembly may be taken. In some instances, a high humidity environment may pose a challenging condition for an e-paper assembly lacking such a moisture vapor barrier. However, the inclusion of the moisture vapor barrier in an example passive e-paper assembly may enable high image quality retention even in such high humidity conditions. In some examples, the moisture vapor barrier may enable the e-paper assembly to retain a high image quality per a moisture vapor transmission rate (MVTR) of less than about 0.1 $g/m^2/day$ at 38 degrees Celsius and 90% relative humidity. Accordingly, via such an example moisture vapor barrier, in some examples the e-paper assembly may retain a high quality image via a moisture vapor transmission rate (MVTR) of less than about 1 $g/m^2/week$ at 38 degrees Celsius and 90% relative humidity.

In some examples, an e-paper assembly may sometimes be referred to as, and/or be incorporated within, an e-paper display media or an e-paper display device.

In some examples, a passive e-paper assembly comprises a charge-responsive, re-writable media layer including a first side and an opposite second side. An airborne-charge receiving layer is disposed on the first side of the media layer and a moisture vapor barrier is interposed between the charge-receiving layer and the first side of the media layer. The moisture vapor barrier may comprise an inorganic material and the moisture vapor barrier is to facilitate migration of charges from the airborne-charge receiving layer to the charge-responsive, re-writable media layer.

The above-noted low permeability of the example inorganic moisture vapor barrier (layer) stands in sharp contrast to at least some commercially available organic polymer materials, which exhibit a relatively high level of permeability to water vapor such that the pertinent thickness of such organic polymers may be prohibitively thick for use in a flexible, passive e-paper display media (e.g. assembly). For instance, a pertinent thickness of at least some of those commercially available organic polymer materials to function well as a moisture vapor barrier may be on the order of tens of microns, which is substantially greater than a thickness of at least some of the example inorganic moisture vapor barrier of the present disclosure. In some examples, in at least this context the term "substantially greater" refers to a difference in thicknesses of at least 25%, 50%, 75%, 100% or even 2×, 3×, etc. difference. In some examples, in at least this context the term "substantially greater" refers to a difference in thicknesses of at least one (or at least two or three) orders of magnitude difference.

With this in mind, it will be understood that, some example inorganic moisture vapor barriers of the present disclosure may have an intrinsic moisture vapor permeability substantially less than the moisture vapor permeability of some such commercially available organic polymers. In some examples, in at least this context the term "substantially less" refers to a difference in permeability of at least 25%, 50%, 75%, 100% or even 2×, 3×, etc. difference. In some examples, in at least this context the term "substantially less" refers to a difference in permeability of at least one (or at least two or three) orders of magnitude difference.

In some examples, the intrinsic relatively low permeability of the example inorganic moisture vapor barrier permits the barrier to be relatively thin, which contributes to the flexibility of the e-paper assembly. Moreover, this thinness in turn permits use inorganic materials having relatively large resistivities with little or no diminishment of image quality on the e-paper assembly.

In some examples, referring to the e-paper assembly as being passive means that the e-paper assembly is electrically passive, i.e. has no active electrode plates, electrode layers, driving electrodes, driving circuits, etc. in order to intentionally cause a change in the image (e.g. information) displayed in the re-writable media layer. Accordingly, in some instances, the passive e-paper assembly may sometimes be referred to as being circuitry-free.

At least in part because the example passive e-paper assembly lacks on on-board power supply and/or internal circuitry, the passive e-paper display media is relatively thin and light, thereby giving the example passive e-paper display a look and feel more like traditional paper.

In some examples, the above-described passive e-paper assembly comprises a counter electrode layer disposed on the second side of the media layer.

In some examples, the above-described passive e-paper assembly further comprises a first adhesion-promoting layer interposed between the airborne-charge receiving layer and the moisture vapor barrier and comprises a second adhesion-promoting layer interposed between the moisture vapor barrier and the first side of the media layer.

Via such arrangements, the charge-responsive re-writable media layer is protected from moisture vapor (e.g. humidity) such that information displayed on the e-paper assembly retains its image quality for extended periods of time despite the presence of moisture vapor. It will be understood that such protection from moisture vapor is distinct from a general water resistance of the charge-receiving layer, counter electrode layer, edges of the passive e-paper assembly, etc. such as when the e-paper assembly is temporarily exposed to spilled liquid, rain drops, etc. Moreover, in least some examples, other portions of an e-paper assembly or display device (e.g. a counter electrode layer, etc.) may provide a sufficient moisture vapor barrier on a non-imaging side of the e-paper assembly even if such layers are organic because a greater thickness is permissible in that particular location and/or charges need not migrate through such layers. Accordingly, in some examples the inorganic moisture vapor barrier layer interposed between the airborne-charge receiving layer and the charge-responsive layer may comprise the sole inorganic moisture vapor barrier of an e-paper assembly. Stated differently, the inorganic moisture vapor barrier is located on the imaging side or surface of the e-paper assembly.

Robust retention of image quality in a passive e-paper display media (e.g. assembly) under a wide variety of environmental conditions may enhance the ability of such passive e-paper display media to function as a gift card, display card, employee badge, guest badges, access badge, transaction medium, etc.

These examples, and additional examples, are described and illustrated in association with at least FIGS. 1-7.

Figure 1:
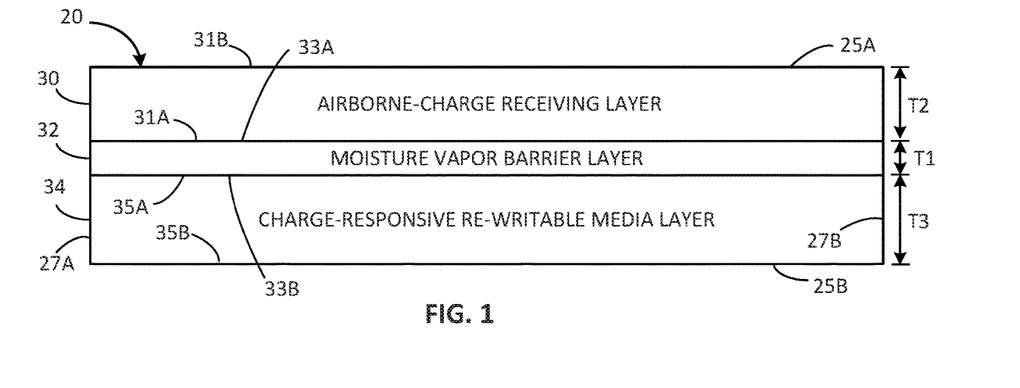
FIG. 1 is a side view schematically representing an example passive e-paper assembly including a moisture vapor barrier.

FIG. 1 is a side view schematically representing an example passive e-paper assembly 20. In some examples, the e-paper assembly 20 may sometimes be referred to as an e-paper display assembly, e-paper display media, and/or e-paper display device. Moreover, in some examples, e-paper assembly 20 may form part of a larger e-paper display media or display device as shown later in association with at least FIGS. 6B-6C.

As shown in FIG. 1, in some examples the passive e-paper assembly 20 comprises a charge-responsive, re-writable media layer 34 including a first side 35A and an opposite second side 35B. An airborne-charge receiving layer 30 is disposed on the first side 35A of the charge-responsive media layer 34 and a moisture vapor barrier 32 is interposed between the airborne-charge receiving layer 30 and the first side 35A of the charge-responsive media layer 34. The moisture vapor barrier 32 comprises an inorganic material and the moisture vapor barrier 34 is to transmit (e.g. permit migration of) charges from the airborne-charge receiving layer 30 to the charge-responsive, re-writable media layer 34. The moisture vapor barrier 32 comprises a first side 33A and an opposite second side 33B.

In some examples, it will be understood that, even in the absence of charge receiving layer 30 (in some examples), charge-responsive media layer 34 is imageable by charges (e.g. FIG. 6A) and that layer 30 may be provided for protection against unintentional and/or malicious mechanical and electrical insults to charge-responsive layer 34. Nevertheless, in at least some examples of the present disclosure, the presence of the charge receiving layer 30 facilitates producing and retaining quality images at charge-responsive media layer 34 in the manner described herein. In some examples, and as further described below, at least charge receiving layer 30 may comprise an anisotropic structure to facilitate the migration of charges (e.g. written by an imager unit 310 in FIG. 6A) on charge-responsive media layer 34.

In some examples, the thickness and type of materials forming airborne-charge receiving layer 30 are selected to mechanically protect at least the charge-responsive media layer 34 (including microcapsules 308 shown in FIG. 6A) from punctures, abrasion, bending, scratching, liquid hazards, crushing, and other impacts. Moreover, in some examples the airborne-charge receiving layer 30 also may protect the charge-responsive media layer 34 from tribo charges.

In some examples, the entire passive e-paper assembly 20 is flexible by virtue of each layer 30, 32, 34 being relative thin and highly flexible.

In some examples, referring to the e-paper assembly as being passive means that the e-paper assembly 20 is electrically passive, i.e. has no active electrode plates, electrode layers, drive electrodes, driving circuits etc. to cause a change in the image (e.g. information) displayed in the re-writable media layer 34. Instead, any change in the image displayed is caused by an external imaging unit, such as but not limited to, the imaging unit described later in association with at least FIG. 6A. Moreover, as previously noted, the e-paper assembly 20 can be relatively, thin and light because its lacks on-board power supply.

Charge-responsive media layer 34 includes components which switch color (e.g. black, white, etc.) when a magnetic field or electrical charges are applied to charge-receiving layer 30. In some examples, the charge-responsive media layer 34 comprises a switchable pigment or die combination. One example of such a charge-responsive media layer 34 (in a passive e-paper assembly) is described later in association with at least FIG. 6A. In some examples, the charge-responsive, re-writable media layer 34 comprises a thickness (T3) between about 20 microns and about 100 microns. In some examples, the charge-responsive media layer 34 comprises organic material(s).

With further reference to FIG. 1, in some examples, the airborne-charge receiving layer 30 comprises a thickness (T2) of between about 50 to about 200 microns, and may comprise organic material(s). In some examples, the airborne-charge receiving layer 30 may comprise an UV curable acrylate, among other materials. In some examples, the airborne-charge receiving layer 30 may comprise an additive, such as magnetite particles, in order to exhibit anisotropic properties to facilitate migration of charges toward the charge-responsive media layer 34. Accordingly, in some such examples, the airborne-charge receiving layer 30 may sometimes also be referred to as an anisotropic layer.

In contrast, as previously noted the moisture vapor barrier 32 may comprise an inorganic material. Accordingly, in some instances, the moisture vapor barrier 32 may sometimes be referred to as being a non-plastic material and/or a non-glass material. In some instances, the moisture vapor barrier 32 may sometimes be referred to as being a non-metal material.

In some examples, the inorganic material of the moisture vapor barrier 32 comprises an inorganic oxide material. In some examples, the inorganic oxide material may comprise aluminum oxide, titanium oxide, and/or silicon oxide, and may comprise similar metal oxide materials in some examples.

In some examples, the inorganic material of the moisture vapor barrier 32 comprises a ceramic material, such as but not limited to, silicon nitride and/or similar materials.

As further shown in the diagram 200 of FIG. 4, an inorganic layer (e.g. 32 in FIGS. 1-3) may be formed via one of a plurality 205 of implementations 210, 212, 214, 216, 218, 220, 222, 224 each of which are further described below. In particular, as shown FIG. 4, in some examples, the inorganic material may be formed and/or deposited via at least one of curable liquid coating 210; sputtering 212; evaporation 214; atomic layer deposition 216; chemical vapor deposition (CVD) 218; ion beam deposition 220; plasma-assisted atomic layer deposition 222; and plasma-assisted chemical vapor deposition 224.

In some examples, the moisture vapor barrier 32 may exhibit a moisture vapor transmission rate (MVTR) of less than about 0.1 g/m²/day at 38 degrees Celsius and 90% relative humidity. In some examples, the moisture vapor barrier 32 may exhibit a moisture vapor transmission rate (MVTR) of less than about 1 g/m²/week at 38 degrees Celsius and 90% relative humidity.

In some examples, such moisture vapor transmission rate (MVTR) may be achieved via moisture vapor barrier 32 having a thickness (T1 in at least FIGS. 1-3) of between about 1 and about 1000 nanometers, and in some examples, a volume electrical resistivity between a lower limit of about $10^9$ Ohm-cm and an upper limit of about $10^{13}$ Ohm-cm. In some examples, the lower limit of resistivity exhibited by the inorganic moisture vapor barrier 32 is high enough to enable sufficient migration of charges through the moisture vapor barrier 32 (from charge receiving layer 30 to charge-responsive media layer 34) to enable writing high quality images on the charge-responsive media layer 34 and to avoid image blurring. In some examples, the higher limit of resistivity exhibited by the inorganic moisture vapor barrier 32 is sufficient to avoid too excessive charge accumulation on an external surface (e.g. imaging surface) of the airborne-charge receiving layer 30. In some such examples, this higher limit curtails excess charge accumulation, which in turn may minimize or avoid inadvertent modifications of an image (displayed on charge-responsive media layer 32) which may occur during user handling of the e-paper assembly 20 if such excess charge accumulations were present.

In some examples, the moisture vapor barrier 32 may comprise an electrical resistivity of about $10^{14}$ Ohm-cm or at least about $10^{14}$ Ohm-cm, such as when the moisture vapor barrier 32 has a sufficiently small thickness such as on the order of a submicron thickness while exhibiting a breakdown voltage of less than about 20 Volts, in some examples. In some examples, the breakdown voltage may be slightly higher such as 30 or 40 Volts.

In some instances, this electrical resistivity of about $10^{14}$ Ohm-cm (or even at least about $10^{14}$ Ohm-cm) may be at least one (or even two or three) orders of magnitude less than an electrical resistivity of some commercially available organic materials which have been sometimes used to prevent moisture vapor intrusion. Such relatively larger resistivities in those commercially available organic polymers may significantly prohibit desired migration of charges if one attempted to deploy them in a passive e-paper assembly according to at least some examples of the present disclosure.

In some examples, such as when the inorganic moisture vapor barrier 32 may have a thickness of about 1 micron (e.g. a maximum in some examples), the inorganic moisture vapor barrier 32 may comprise dielectric strength of about 20 Volts/micron (or less than about 20 Volts/micron) such that the maximum surface charge (e.g. breakdown voltage) would be less than 20 Volts. In one aspect, the breakdown voltage equals a thickness multiplied by the dielectric strength, wherein the dielectric strength may represent the maximum electrical field that a material can experience before charge conduction starts to occur. With this in mind, the breakdown voltage may represent the maximum voltage difference that a material can experience before charge conduction starts to occur. Via such arrangements, the relatively thin structure and intrinsic nature of the inorganic material would be expected to result in insignificant charge accumulations at a surface of the moisture vapor barrier 32 and/or charge receiving layer 30. In at least this way, excess charge accumulation and/or blurring (in some cases) may be avoided such that high quality image formation and/or retention may occur for the example passive e-paper assembly.

At least some such example arrangements of a moisture vapor barrier 32 of the present disclosure stand in sharp contrast to the at least some commercially available organic materials (used for moisture vapor barriers) having a very high resistivity (e.g. $10^{18}$ Ohm-cm) and typically implemented in thicknesses of at least about 10 microns, while exhibiting a breakdown voltage of about 200 Volts or more than 200 Volts. If one attempted to use such commercially available arrangements for moisture vapor barrier 32, a surface charge build-up of about 200 Volts (or more) likely would occur, which would interfere with quality image retention related to unintentional impact of such charges on the image at charge-responsive media layer 34 during handling of the e-paper assembly 20. In some cases, such an arrangement may result in blurring of an image at charge-responsive media layer 34.

In some examples, the thickness (T1) of the moisture vapor barrier 32 is about 10 to about 500 nanometers. In some examples, the thickness (T1) is about 15 to about 300 nanometers. In some examples, the thickness (T1) is about 20 to 200 nanometers.

While not shown for illustrative simplicity, it will be understood that in at least some examples, the edges of the e-paper assembly 20 (e.g. edges of the respective media layer, charge-receiving layer, counter electrode layer, etc.) are sealed to prevent intrusion of moisture, whether in the form of liquid and/or vapor.

In at least the example shown in FIG. 1, the moisture vapor barrier 32 is located interior to the airborne-charge receiving layer 30 such that the relatively thin moisture vapor barrier is protected structurally. In some such examples, this interior location may be relatively more effective for humidity protection than if the moisture vapor barrier 32 were attempted to be placed outside the airborne-charge receiving layer 32.

However, in some examples, the moisture vapor barrier 32 may be located external to the airborne-charge receiving layer 30. In some such examples, touching or handling of the e-paper assembly 20 (and in particular the moisture vapor barrier 32) would be significantly minimized or excluded completely in order to preserve the integrity of the moisture vapor barrier 32. In some such examples, among the variety of inorganic materials disclosed herein from which the moisture vapor barrier 32 may be formed, more durable materials may be selected when the moisture vapor barrier 32 is located external to the airborne-charge receiving layer 30. It will be further noted that such an external location of the moisture vapor barrier 32 in some examples is not believed to significantly affect the performance of the airborne-charge receiving layer 30 in view of the relatively thin structure of the moisture vapor barrier 32 and/or the sufficiently similar resistivity attributes of the moisture vapor barrier (as compared to the charge receiving layer 30).

Figure 2:
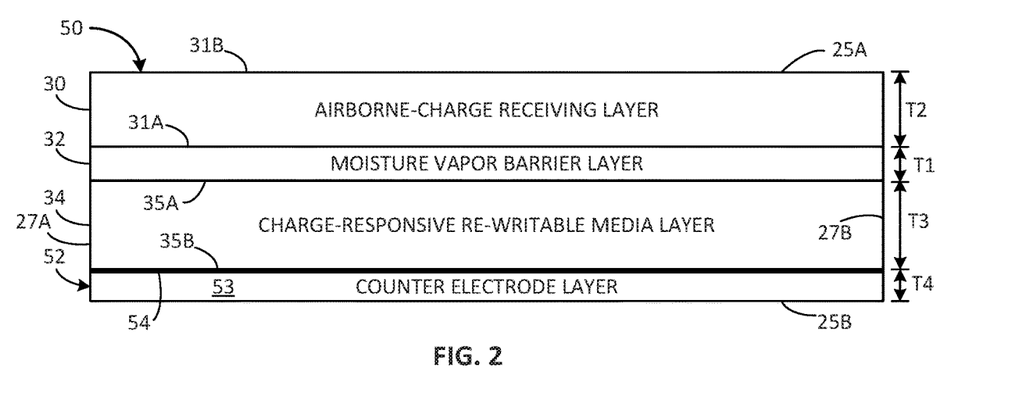
FIG. 2 is a side view schematically representing an example passive e-paper assembly like in FIG. 1 and further including a counter electrode layer.

FIG. 2 is a side view schematically representing an example passive e-paper assembly 50 comprising at least some of substantially the same features and attributes as the passive e-paper assembly 20 (FIG. 1), except further comprising a counter electrode layer 52.

Figure 6A:
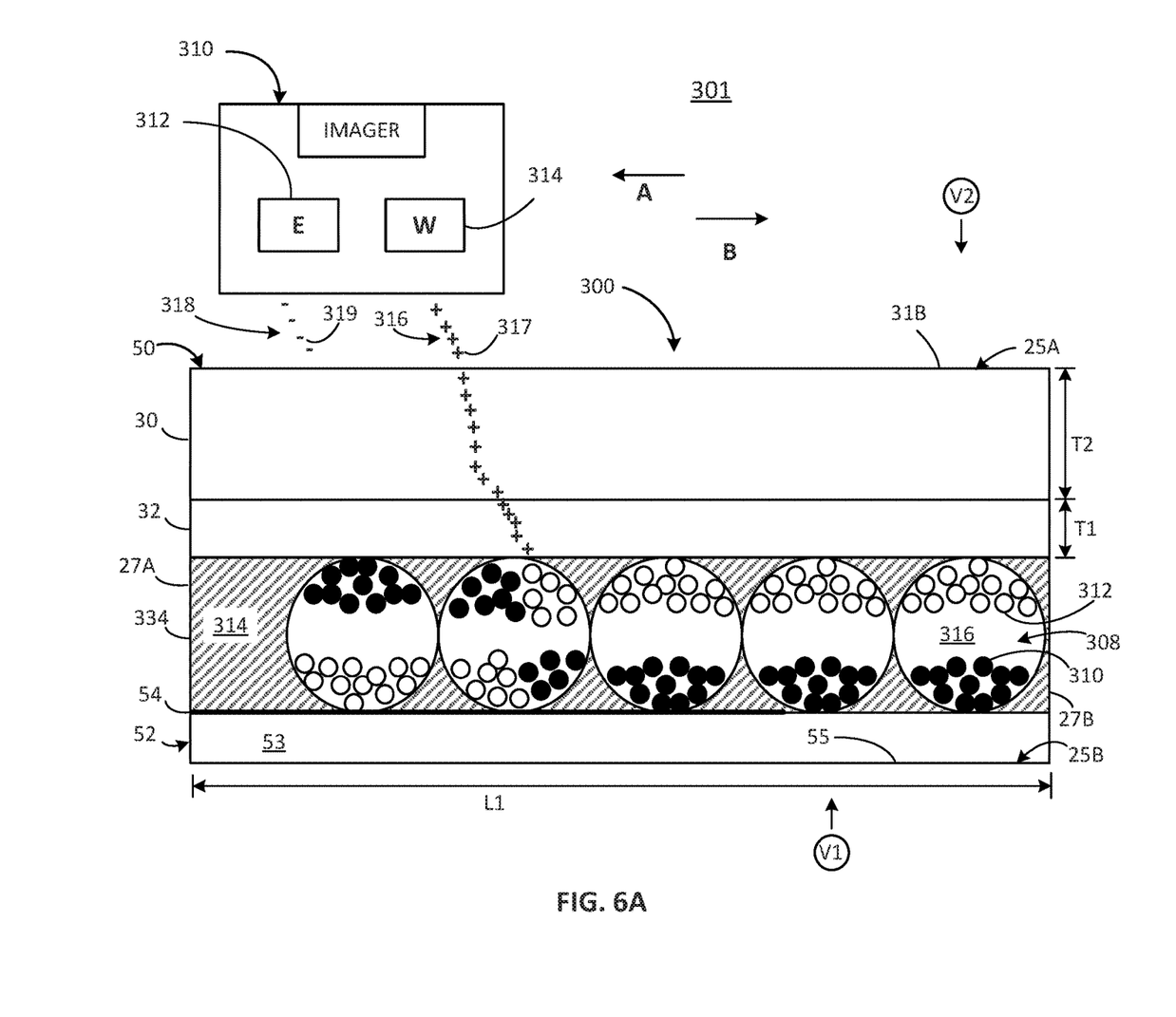
FIG. 6A is a diagram including a partial sectional view schematically representing an example e-paper assembly and a side plan view schematically representing an example imaging unit.

Counter electrode layer 52 provides a counter electrode for the imaging of e-paper display assembly by an imager unit (e.g. 310 in FIG. 6A). In some instances, the counter electrode layer 52 may sometimes be referred to as a ground electrode or ground electrode layer. In some examples, the counter electrode layer 52 comprises a distinct conductive element 54 acting as a ground electrode.

With this in mind, the counter electrode layer allows counter charges to flow to ground electrode from a writing module (e.g. imager unit 310 in FIG. 6A). Thus, e-paper assembly 50 (FIG. 2) remains basically charge neutral despite charges being emitted onto airborne-charge receiving layer 30. Without a connection between counter electrode layer 52 and an imager unit (e.g. 310 in FIG. 6A), no appreciable amount of charges can be emitted onto charge receiving layer 30 and thus no information can be written to charge-responsive media layer 34.

In some examples, instead of having a distinct conductive element 54 apart from barrier 53, the counter electrode layer 52 may comprise a single element made of transparent conductive material, such as indium tin oxide. In some examples, counter electrode layer 52 may comprise an opaque conductive material, such as when the first side 25A may act as the viewing side of the e-paper display media 50. In one example, counter electrode layer 52 has a thickness (T4) between 5 nm and 1 mm.

Figure 3:
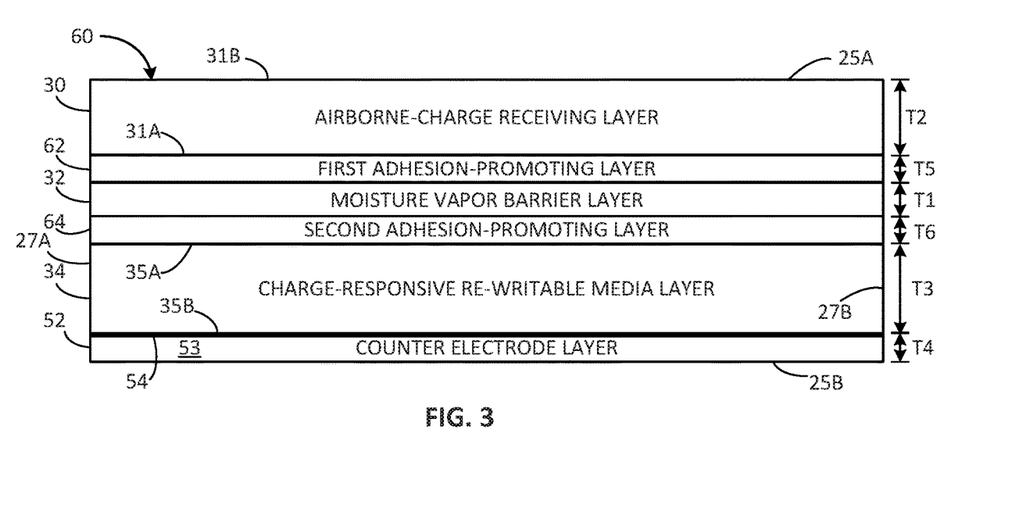
FIG. 3 is a side view schematically representing an example passive e-paper assembly like in FIG. 2 and further including adhesion-promoting layers.
Figure 4:
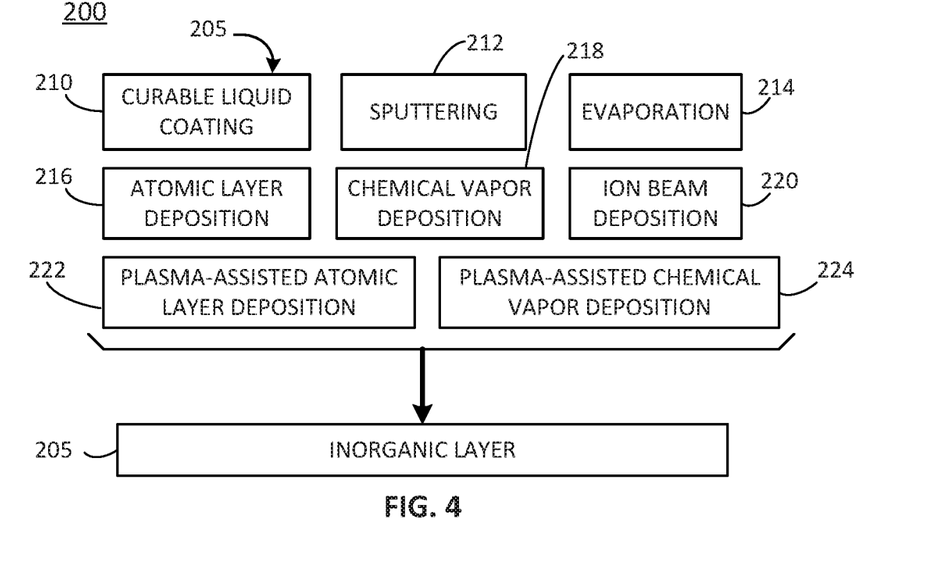
FIG. 4 is a block diagram schematically representing example methods of forming an inorganic moisture vapor barrier.

FIG. 3 is a side view schematically representing an example passive e-paper assembly 60 comprising at least some of substantially the same features and attributes as the passive e-paper assembly 20 (FIG. 1) and/or passive e-paper assembly 50 (FIG. 2), except further comprising first and second adhesion-promoting layers 62, 64. In at least some examples, the first adhesion-promoting layer 62 may enhance adhesion between the airborne-charge receiving layer 30 and the moisture vapor barrier 32 and may enhance adhesion between the moisture vapor barrier 32 and the charge-responsive media layer 34.

As further shown in the diagram 250 of FIG. 5, an adhesion-promoting layer 265 (e.g. 60, 62 in FIG. 3) may be formed via one of a plurality 255 of implementations 260, 262, 264, 268, 270, 272, 274 each of which are further described below.

In some examples, at least one of the respective first and second adhesion-promoting layers 62, 64 may act like a skin to prevent cracking and/or imperfections in the inorganic moisture vapor barrier 32, such as might otherwise occur in some instances after formation of the inorganic moisture vapor barrier 32 in the absence of one of the respective first and second adhesion-promoting layers 62, 64.

In some examples, at least one of the first and second adhesion promoting layers 62, 64 may help homogenize an inhomogeneous surface, which may in turn enhance adhesion relative to the inorganic moisture vapor barrier 32. For instance, in some examples the charge-responsive media layer 34 may comprise an inhomogeneous surface. In some examples, the inhomogeneous surface may comprise capsules in a binder (e.g. FIG. 6), which may exhibit an inhomogeneous surface resulting from its multi-material aggregation.

In some examples, at least one of the first and second adhesion-promoting layers 62, 64 may facilitate adhesion (between the inorganic moisture vapor barrier and one of the respective organic layers (30 or 34) by acting as a bridge for the mismatched chemistries (inorganic vs. organic) of the inorganic moisture vapor barrier relative to the charge-receiving layer 30 or relative to the charge-responsive media layer 34. In some such examples, at least one of the respective first and second adhesion-promoting layers 62, 64 may comprise a hybrid material 262, as shown in the diagram of FIG. 5. In some examples, the hybrid material comprises at least one inorganic functional group and at least one organic functional group. In some such examples, the hybrid material may comprise an organosilane material, such as tetraethoxysilane (TEOS), silsesquioxane, etc.

Figure 5:
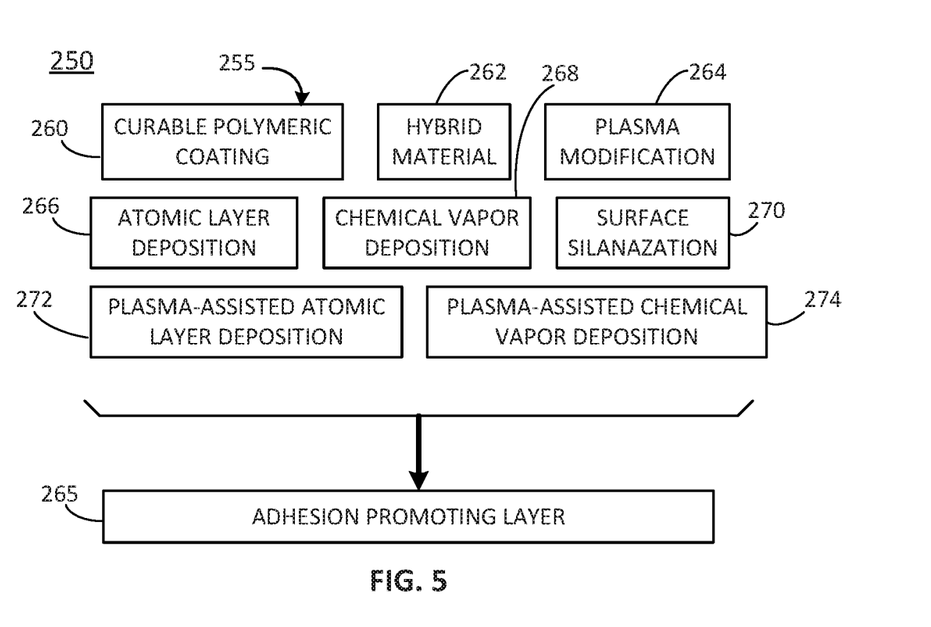
FIG. 5 is a block diagram schematically representing example methods and/or materials to form an adhesion-promoting layer.

In some examples, at least one of the respective first and second adhesion layers 62, 64 may comprise an organic polymer material 260 in FIG. 5. In some examples, the organic polymer material may be flowable and curable, such as via thermal or ultraviolet (UV) radiation. For instance, the polymer material may comprise a UV curable acrylate, which may comprise some surface functional groups to facilitate adherence to inorganic materials, such as moisture vapor barrier 32.

In some examples, the first adhesion-promoting layer 62 may be implemented as a surface defined on a first side 31A of the airborne-charge receiving layer 30, which generally faces the charge-responsive media layer 34 and the second adhesion-promoting layer 64 may be implemented as a surface defined on a first side 35A of the charge-responsive media layer 34. In some examples, such first and second adhesion-promoting surfaces 62, 64 may be implemented via plasma modification 264 as shown in the diagram of FIG. 5. For instance, via exposure to a gaseous plasma, the surface defining the first side 31A of the airborne-charge receiving layer 30 may be transformed chemically into an adhesion-promoting surface to facilitate bonding relative to the first side 33A of inorganic moisture vapor barrier 32 and the surface defining the first side 35A of the charge-responsive media layer 34 may be transformed chemically into an adhesion promoting surface to facilitate bonding relative to the second side 33B of inorganic moisture vapor barrier 32.

In some examples, at least one of the first and second adhesion-promoting layers (or surfaces) 62, 64 may be implemented via at least one of atomic layer deposition 266, chemical vapor deposition 268, surface silanazation 270, plasma-assisted atomic layer deposition 272, and plasma-assisted chemical vapor deposition 274, as shown in the diagram of FIG. 5. In some examples, implementation via surface silanazation may be used when tetraethoxysilane (and similar materials) is employed to form at least one of the first and second adhesion-promoting layers 62, 64.

In some examples, the first and second adhesion-promoting layer 62, 64 comprise a thickness (T5, T6) of less than about 50 microns. Accordingly, among other attributes, the relative thinness of the first and second adhesion-promoting layers 62, 64 (or surface) help to minimize inhibition of (and/or help facilitate the) migration of charges from the airborne-charge receiving layer 30 to the charge-responsive layer 34. Accordingly, in some examples the moisture vapor barrier 32 and/or first and second adhesion-promoting layers 62, 64 may exhibit such anisotropic behavior.

In some examples, at least one of the first and second adhesion promoting layers 62, 64, the inorganic material vapor barrier 32, and/or airborne-charge receiving layer 30 may comprise additives which confer the ability to dissipate static charge. In some examples, such additives can be either conductive particles or molecular additives. In some examples, such conductive particles have diameters in the range of tens of nanometers to tens of micrometers and can be from several classes of materials. These material may comprise metallic materials such as silver, conductive oxide materials such as indium tin oxide, intrinsically conducting polymer materials such as polyaniline, or magnetic materials such as magnetite.

In addition, in some examples, the additive particles can be aligned in a magnetic or electric field to enhance conductivity in one direction such as the out-of-plane direction. In some instances, a material or layer having such alignment may sometimes be referred to being anisotropic. In some instances, by embodying an anisotropic structure, a layer (e.g. airborne-charge receiving layer 30) may enhance migration of charges to the charge-responsive media layer 34.

In some examples, molecular additives may comprise quaternary ammonium salts. One quaternary ammonium salt may comprise tetrabutylammonium hexafluorophosphate.

In some examples, at least one of the first and second adhesion-promoting layers 62, 62 may exhibit a resistivity between a lower limit of about $10^9$ Ohm-cm and an upper limit of about $10^{13}$ Ohm-cm. In some examples, such a range of resistivity is applicable for a thickness (T5 and T6) of the first and second adhesion-promoting layers 62, 64 on the order of microns. In some examples, such a range of resistivity may be applicable for a thickness (T5 and T6) on the order of tens of microns.

However, in some examples in which the respective thicknesses (T5 and/or T6) may be on the order of at least hundreds of microns, then the respective first and second adhesion-promoting layers 62, 64 may be implemented with an anisotropic structure as described above such that migrating charges may readily flow out of plane (instead of in the plane of the charge receiving surface).

Via such resistivities and associated thicknesses of the respective first and second adhesion-promoting layers 62, 64, such arrangements may help to prevent an undesired amount of charge accumulation on a surface of the charge receiving layer 30 and/or help to prevent an undesirable amount of lateral spreading of charges on the charge receiving surface and/or as the charges migrate from the charge receiving layer 30 to the counter electrode layer 52.

In some examples, the inorganic moisture vapor barrier 32 and/or the first, second adhesion-promoting layers 62, 64 may be transparent or translucent. In some such examples, airborne-charge receiving layer 30 may be omitted or also be made transparent/translucent.

FIG. 6A is a diagram 301 including a cross-sectional view schematically representing one example e-paper assembly 300 and a side plan view schematically representing an example imager unit 310. In some examples, e-paper assembly 300 comprises at least some of substantially the same features and attributes of the e-paper assemblies (e.g. 20, 50, 60), as previously described in association with at least FIGS. 1-5.

In some examples, charge-responsive media layer 334 of e-paper assembly 300 provides one example implementation for charge-responsive media layer 34 of an e-paper assembly (e.g. 20, 50, 60) as previously described and illustrated with reference to at least FIGS. 1-3. As shown in FIG. 6A, e-paper assembly 300 comprises an airborne-charge receiving layer 30, moisture vapor barrier 32, and charge-responsive media layer 334, with similar reference numerals referring to like elements in FIGS. 1-3. It will be understood that e-paper assembly 300 may comprise first and second adhesion-promoting layers 60, 62 (FIG. 3) in some examples, but they are omitted from FIG. 6A for illustrative simplicity.

In some examples, the external surface 55 of counter electrode layer 52 comprises a viewing side 25B of the e-paper assembly 300 as represented by the directional arrow V1. Meanwhile, external surface 31B of airborne-charge receiving layer 30 provides the surface at which charges are applied (e.g. an imaging surface) for e-paper assembly 300.

As shown in FIG. 6A, in some examples the charge-responsive media layer 334 includes microcapsules 308 encapsulated by a resin or polymer 314. In one example, each microcapsule 308 includes black particles 310 and white particles 312 suspended in a fluid medium 316.

In some examples, when held in a viewing position, ambient light is transmitted through a transparent (or translucent) counter electrode layer 52, strikes microcapsules 308, and is reflected back to the viewer V1. In instances in which white particles 312 of a microcapsule 308 are located near counter electrode layer 52, the respective microcapsule 308 appears white to a viewer V1. However, when black particles 310 of a microcapsule 308 are located near counter electrode layer 52, the respective microcapsule 308 appears black to the viewer V1. The particles 310 and 312 have opposite charges. For example, black particles 310 can be positively charged particles, and white particles 312 can be negatively charged particles, such that when ions (e.g. positive or negative charges) are written to the charge-responsive media layer 334, the respective particles 310, 312 respond according to the respective attractive or repelling forces. Various shades of gray can be created by varying the arrangement of alternating microcapsules with white and black particles located near counter electrode layer 52 to produce halftoning.

With this in mind, as further shown in FIG. 6A, an imager unit 310 comprises an erasing head 312 and a writing head 314. In some examples, the respective heads 312, 314 may comprise an ion-based technology, which generates charges from a corona and emits the charges, via an individually addressable electrode array, in a selectable pattern toward the charge receiving layer 30. In some examples, other energy sources may be used to generate the ions, e.g. positive and/or negative charges.

The imager unit 310 and e-paper assembly 300 are arranged for relative movement to each other. For instance, the e-paper assembly 300 may be movable relative to a fixed imager unit 310 or the imager unit 310 may be movable relative to an e-paper assembly 300 in a temporarily fixed position. The imager unit 310 is spaced apart from the external surface 31B of charge responsive layer 30, such that charges emitted from imager unit 310 travel airborne to first side 31B of charge responsive layer 30. In the particular example shown in FIG. 6A, the imager unit 310 is shown moving in direction A (when e-paper assembly 300 is fixed) or the e-paper assembly 300 media is shown moving in direction B (when imager unit 310 is fixed). During such relative movement, in some examples the erasing head 312 emits a plurality 318 of negative charges 319 onto charge receiving layer 30 to erase any prior image held by the media layer 334. Then the writing head (W) 314 emits a plurality 316 of positive charges 317 in a selectable pattern (e.g. via an addressable electrode array) onto charge-receiving layer 30. In general, a sufficient number of the charges 317 migrate through the charge-receiving layer 30 and through the moisture vapor barrier 32 such that the charges affect the distribution of the black and white particles 310, 312 within microcapsules 308 at selected positions of an array of microcapsules. In the example shown, because the black particles 310 are positively charged, they are repelled away from the positive charges applied at charge receiving layer 30 while the white particles 312 (which are negatively charged) are attracted to the positive charges applied to the charge receiving layer 30. As a result, the black particles 310 in the selected microcapsules 308 form an image viewable from side 25B, as represented by the directional arrow V1.

In some examples, as represented by the directional arrow V2, the surface 31B at the charge receiving layer 30 may comprise the viewing surface/side of the e-paper assembly 300. Accordingly, in such examples, the charge receiving layer 30 comprises both the imaging side of the e-paper assembly 300 and the viewing side of the e-paper assembly 300.

In some examples, the black particles 310 can be negatively charged particles, and white particles 312 can be positively charged particles. In some such examples, the polarity of the respective erasing and writing heads 312, 314 of the imaging unit 310 may be reversed.

Microcapsules 308 exhibit image stability using chemical adhesion between particles and/or between the particles and the microcapsule surface. For example, microcapsules 308 can hold text and images indefinitely without using electricity, while allowing the text or images to be changed later.

In some examples, the diameter of each microcapsule 308 is substantially constant within layer 334 and can be in one example between 20 µm and 100 µm, such as 50 µm. In some examples, at least a portion of counter electrode layer 52 can be composed of a transparent conductive material, such as indium tin oxide, or an opaque material.

E-paper assembly 300 may have a variety of other configurations. In some examples, each microcapsule 308 may include black particles suspended in a white colored fluid. The black particles can be positively charged particles or negatively charged particles. One or more microcapsules form a pixel of black and white images displayed on e-paper assembly 300. The black and white images are created by placing black particles near or away from counter electrode layer 52 (when surface 55 is the viewing side—V1) or from charge receiving layer 30 (when surface 31B is the viewing side—V2). For example, microcapsules 308 having black particles 310 located away from counter electrode layer 52 reflect white light, corresponding to a white portion of an image displayed on e-paper assembly 300 as viewable on a first viewing side V1. In contrast, the microcapsules with black particles located near counter electrode layer 52 appear black to a viewer V1 corresponding to a black portion of the image displayed on e-paper display 300. Various shades of gray can be created by using halftoning with black particles located near or away from counter electrode layer 52.

With these example implementations in mind regarding at least FIG. 6A, in some instances, commercially available organic polymers may not be suitable for use a moisture vapor barrier (e.g. layer 32) because of such commercially available organic polymers have a very large volume resistivity, such as $10^{18}$ Ohm-cm. If such materials were attempted to be used as layer 32 in some of the example e-paper assemblies, a large accumulation of charges (emitted from imager unit 310 in FIG. 6A) may build up on surface 31B on charge receiving layer 30 instead of such charges being allowed to migrate to charge-responsive media layer 334. In some instances of using such commercially available organic polymers (instead of the example inorganic moisture vapor barrier), a combination of the high resistivity and the build up of charges on the surface (e.g. 31B) may cause incoming emitted charges (from imager unit 310) to be deflected laterally, which may result in a blurring of the image to be displayed via charge-responsive media layer 334. In addition, in many such commercially available organic polymers, the surface of such layers may exhibit a relative low surface resistivity, which might in turn cause charges (emitted from imager unit 310 in FIG. 6A) to flow along the surface of the layer, thereby resulting a blurring of the image displayed via charge-responsive media layer 334.

Figure 6B:
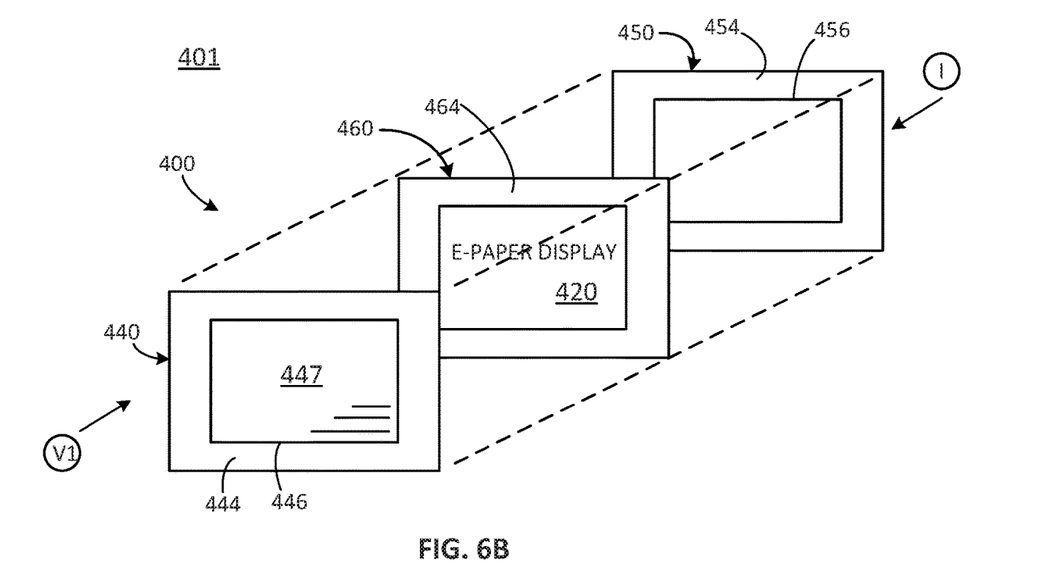
FIG. 6B is an exploded view schematically representing an example passive e-paper display media.

FIG. 6B is a diagram 401 including an exploded view schematically representing an example a passive e-paper display device 40. As shown in FIG. 6B, in some examples display device 400 may comprise support members 440, 450, 460 which are formed about and/or secured relative to an e-paper display 420 (e.g. e-paper assembly 20, 50, 60, 300 in FIGS. 1-3, 6A). In one aspect, such arrangements may facilitate the passive e-paper display 420 to function as a gift card, employee badge, display card, transaction medium, etc. In some examples, one support member 460 comprises a frame 464 formed about and/or on the edges of the passive e-paper display 420. In some examples, support member 460 may be further sandwiched between a first outer support member 440 and a second outer support member 450, as shown in FIG. 6B. The first outer support member 440 comprises a frame 444 defining a window 446 holding a transparent member 447 through which the passive e-paper display 420 is visible and viewable as represented via indicator V1. The second outer support member 450 comprises a frame 454 defining a window 456 through which a charge receiving layer (e.g. 30 in FIGS. 1-3, 6A) of the passive e-paper display 420 will be accessible for imaging via an imager unit (e.g. 310 in FIG. 6A), as represented via indicator I.

Upon securing the respective support members 440, 460, 450 relative to each other, a single e-paper display device 400 provides a relatively thin, flexible e-paper display media which may enable robust use and handling in a wide variety of conditions while retaining high quality images on e-paper display 420. The e-paper display device 400 is configured to cooperate with an imager unit (e.g. 310 in FIG. 6A) while still being usable and handled like any common gift card, identification card, access badge, etc. As such, the e-paper display device 400 is highly flexible, thin, light and resistant to wear, impact, etc. Moreover, with the inclusion of moisture vapor barrier 32 (e.g. FIGS. 1-3, 6A) within the e-paper display 420, the display device 400 can withstand high humidity conditions for an extended period of time without significantly affecting the image quality on e-paper display 420.

Figure 6C:
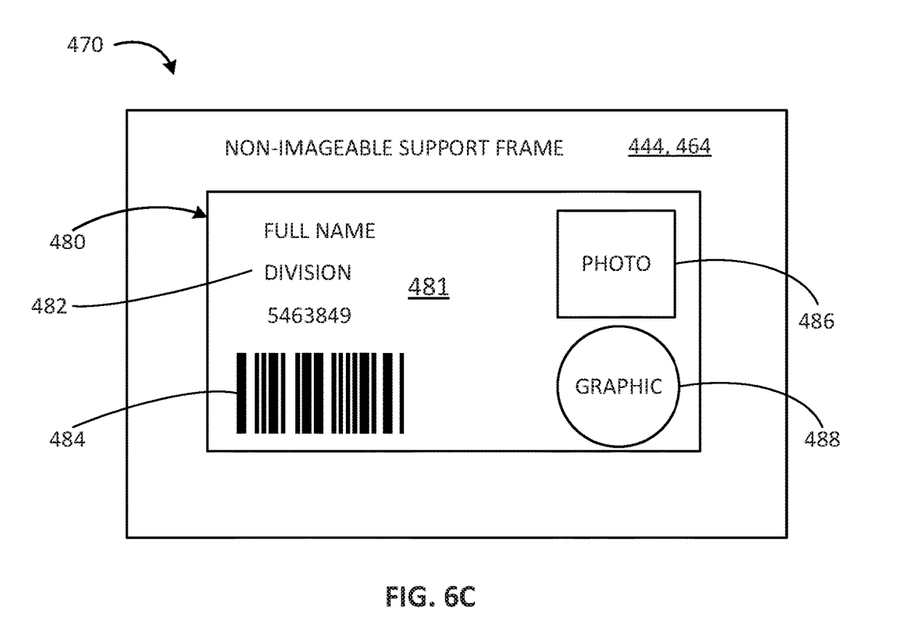
FIG. 6C is top plan view schematically representing an example passive e-paper display media.

FIG. 6C is top plan view schematically representing an example e-paper display device 470. In some examples, the e-paper display device 470 comprises an e-paper assembly 480 supported via support frame (e.g. 444 and/or 464 in FIG. 6B). In some examples, e-paper assembly 480 comprises at least some of substantially the same features and attributes as the example e-paper assemblies (e.g. 20, 50, 60, 400), as previously described in association with at least FIGS. 1-6B.

As represented in FIG. 6C, the support frame is a non-imageable support frame in that it does not embody re-writing images in the manner previously described for the example e-paper assemblies (20, 50, 60, 300). However, this does not preclude support frame (e.g. 444) from bearing images (e.g. text, graphics, photos) printed via non-e-paper technologies.

FIG. 6C also schematically represents at least some of the types of information which can form part of an image 481 on an e-paper assembly 480. For instance, image 481 may comprise text 482, such as alphanumeric expressions like names, numbers, etc. In some instances, image 481 may comprise machine readable markings 484, such as a bar code or QR code. In some instances, image 481 may comprise a photo 486 and/or a graphic 488.

It will be understood that in some instances, it may be desirable to retain such information in image 481 in a clear, accurate manner for an extended period of time. Hence, it will be apparent that the introduction of the moisture vapor barrier 32 (between the charge-receiving layer 30 and the charge-responsive media layer 34 to prevent intrusion of moisture vapor) may play a significant role in quality image retention, which in turn may enhance accuracy and readability of the information displayed. This performance, in turn, may contribute to the widespread, robust use of such passive e-paper media.

Figure 7:
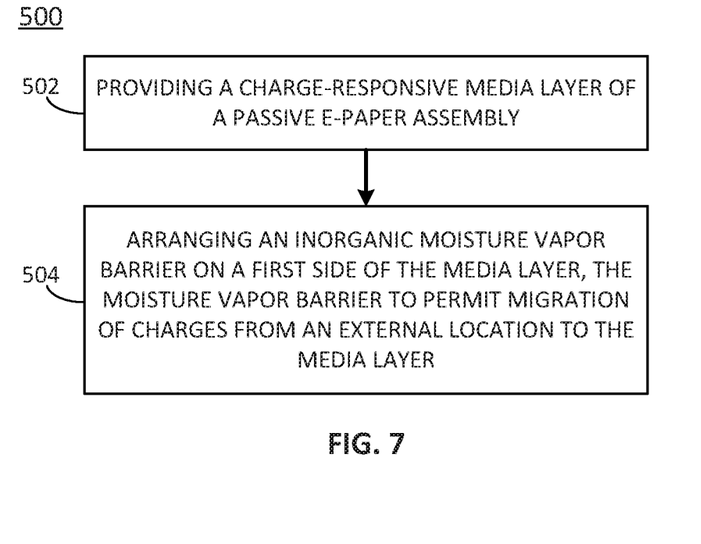
FIG. 7 is a flow diagram schematically representing an example method of manufacturing a passive e-paper assembly.

FIG. 7 is a flow diagram schematically representing an example method 500 of manufacturing. In some examples, method 500 may be performed via the assemblies, layers, structures, barriers, etc. as previously described in association with at least FIGS. 1-6C. In some examples, method 500 may be performed via assemblies, layers, structures, barriers, etc. other than those previously described in association with at least FIGS. 1-6C.

As shown at 302 in FIG. 7, method 500 comprises providing a charge-responsive media layer of a passive e-paper assembly. At 504, method 500 comprises arranging an inorganic moisture vapor barrier on a first side of the media layer, with the moisture vapor barrier to permit migration of charges from an external location to the media layer.

In some examples, the external location may refer to a location at which charges are emitted by an imager unit (e.g. 310 in FIG. 6A) spaced apart from the charge receiving layer, with such airborne charges being received by the charge receiving layer through which the charges migrate before migrating through the moisture vapor barrier on their way to the charge-responsive media layer. In some examples, the charges also migrate through adhesion-promoting layers (or surfaces) when present on opposite sides of the moisture vapor barrier.

In addition, in some examples, the method 500 of manufacturing may incorporate at least some of the feature and attributes of the assemblies, layers, structures, barriers, etc. as previously described in association with at least FIGS. 1-6C. For instance, some examples of a method of manufacturing of a passive e-paper assembly may comprise the features and attributes of the materials and/or methods of forming a moisture vapor barrier and/or adhesion-promoting layers as previously described in association with at least FIGS. 4-5.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A passive e-paper assembly comprising:
a charge-responsive, re-writable media layer including a first side and an opposite second side;
an airborne-charge receiving layer disposed on the first side of the media layer; and
a moisture vapor barrier interposed between the charge-receiving layer and the first side of the charge-responsive media layer, wherein the moisture vapor barrier comprises an inorganic material, and wherein the moisture vapor barrier is to permit migration of charges from the airborne-charge receiving layer to the charge-responsive, re-writable media layer,
wherein the moisture vapor barrier comprises a thickness of about 1 to 1000 nanometers, and
wherein the moisture vapor barrier comprises a lower limit of electrical resistivity of about $10^9$ Ohm-cm and comprises at least one of:
an upper limit of electrical resistivity of about $10^{13}$ Ohm-cm; and
a breakdown voltage of less than about 20 Volts.

2. The e-paper assembly of claim 1, comprising:
a counter electrode layer disposed on the second side of the media layer.

3. The e-paper assembly of claim 1, wherein the inorganic material comprises at least one of an inorganic oxide material and a ceramic material.

4. The e-paper assembly of claim 1, comprising:
a first adhesion-promoting layer interposed between the airborne-charge receiving layer and the moisture vapor barrier; and
a second adhesion-promoting layer interposed between the moisture vapor barrier and the first side of the charge-responsive media layer.

5. The e-paper assembly of claim 4, wherein at least one of the respective first and second adhesion-promoting layers comprises at least one of:
a hybrid material including at least one inorganic functional group and at least one organic functional group; and
an organic polymer material.

6. The e-paper assembly of claim 1, comprising:
a first adhesion-promoting surface defined on a first side of the airborne-charge receiving layer, which faces the media layer; and
a second adhesion-promoting surface defined on a first side of the charge-responsive re-writable media layer,
wherein at least one of the respective first and second adhesion-promoting surface comprise a plasma-modified surface.

7. The e-paper assembly of claim 1, wherein at least the airborne-charge receiving layer comprises an anisotropic structure to facilitate migration of charges toward the charge-responsive media layer.

8. The e-paper assembly of claim 1, wherein the moisture vapor barrier comprises a moisture vapor transmission rate (MVTR) of less than about 1 g/m2/week at 38 degrees Celsius and 90% relative humidity.

9. A moisture vapor barrier comprising:
an inorganic layer to be interposed between an airborne-charge receiving layer and a first side of a charge-responsive, re-writable media layer of a flexible, passive e-paper assembly, and wherein the at least partially inorganic layer is to permit migration of charges from the airborne-charge receiving layer to the charge-responsive media layer, wherein the inorganic layer comprises a thickness of about 1 to 1000 nanometers, comprises a lower limit of electrical resistivity of about $10^9$ Ohm-cm, and comprises at least one of:

an upper limit of electrical resistivity of about $10^{13}$ Ohm-cm; and a breakdown voltage of less than about 20 Volts.

10. The moisture vapor barrier of claim 9, wherein at least one of the charge receiving layer and the charge-responsive media layer comprise an organic material.

11. The moisture vapor barrier of claim 9, wherein the moisture vapor barrier comprises a moisture vapor transmission rate (MVTR) of less than about 1 g/m2/week at 38 degrees Celsius and 90% relative humidity.

12. A method of manufacturing comprising:

providing an airborne-charge receiving layer of a passive e-paper assembly;

providing a flexible, passive, airborne-charge-responsive re-writable media layer of the passive e-paper assembly; and interposing an airborne-charge-transmissible moisture vapor barrier between the airborne-charge receiving layer and the airborne-charge-responsive media layer, the moisture vapor barrier comprising a flexible inorganic material.

13. The method of claim 12, comprising:

arranging the moisture vapor barrier to have a moisture vapor transmission rate (MVTR) of less than about 1 g/m2/week at 38 degrees Celsius and 90% relative humidity, a thickness of between about 1 and about 1000 nanometers; and arranging the moisture vapor barrier to comprise a lower limit of electrical resistivity of about 109 Ohm-cm and to comprise at least one of:

an upper limit of electrical resistivity of about $10^{13}$ Ohm-cm; and an upper limit of electrical resistivity of at least about $10^{14}$ Ohm-cm while exhibiting a breakdown voltage of less than about 20 Volts.

* * * * *